Feb. 14, 1950     D. H. REEVES     2,497,557
FLUID VALVE ASSEMBLY

Filed Nov. 2, 1943          3 Sheets-Sheet 1

INVENTOR
Donald H. Reeves
BY Henry G. Dybvig
His ATTORNEY.

Feb. 14, 1950 D. H. REEVES 2,497,557
FLUID VALVE ASSEMBLY
Filed Nov. 2, 1943 3 Sheets-Sheet 2

INVENTOR.
Donald H. Reeves
Henry G. Dyburg
BY
His ATTORNEY.

Feb. 14, 1950     D. H. REEVES     2,497,557
FLUID VALVE ASSEMBLY
Filed Nov. 2, 1943     3 Sheets-Sheet 3

INVENTOR.
Donald H. Reeves
BY Henry G. Dybvig
His ATTORNEY.

Patented Feb. 14, 1950

2,497,557

UNITED STATES PATENT OFFICE 2,497,557

FLUID VALVE ASSEMBLY

Donald H. Reeves, Dayton, Ohio, assignor to Donald H. Reeves and Associates, Beulah, Mich., a partnership Application November 2, 1943, Serial No. 508,721

11 Claims. (Cl. 251—24)

This invention relates to a fluid valve assembly or faucet and more particularly to a valve or faucet that may be frequently opened and closed.

In the past, valves and faucets have usually been provided with leathers, washers or gaskets that are attached to the movable part and move into and out of engagement with the valve seat in response to predetermined movements of the movable member which supports such leathers, washers or gaskets. In the majority of valves and faucets now in use, such leathers or washers are rotated in position when engaging the valve seat, which causes the leather or washer to wear very rapidly. Furthermore, this rubbing action injures the seat, in that it wears rapidly.

An object of this invention is to improve valve assemblies. More specifically, an object of this invention is to provide a seal that is supported independently of the mechanism that opens and closes the valve, so that the sealing member normally moves in a direction substantially normal to the plane of the valve seat when either opening or closing the valve.

Another object of this invention is to provide a valve or faucet that can be used without having to replace any of the parts to prevent leakage for a longer period of time than is possible with faucets now in general use.

Another object of this invention is to provide a valve or faucet wherein accidental dripping is eliminated and practically impossible.

Another object of this invention is to provide a valve mechanism that may be manipulated to automatically close or to remain in open position when released at the will of the user.

Another object of this invention is to provide a valve or faucet that does not require any packing, gaskets or washers to prevent leakage around the control mechanism for the valve.

Another object of this invention is to provide a valve or faucet that does not have parts in the fluid chamber which can come loose and interfere with the operation.

Another object of this invention is to provide a valve or faucet wherein all parts of the operating mechanism are sealed from the fluid that passes through the valve or faucet.

Other objects and advantages reside in the construction of parts, the combination thereof and the mode of operation, as will become more apparent from the following description.

Referring to the drawings.

Figure 11:
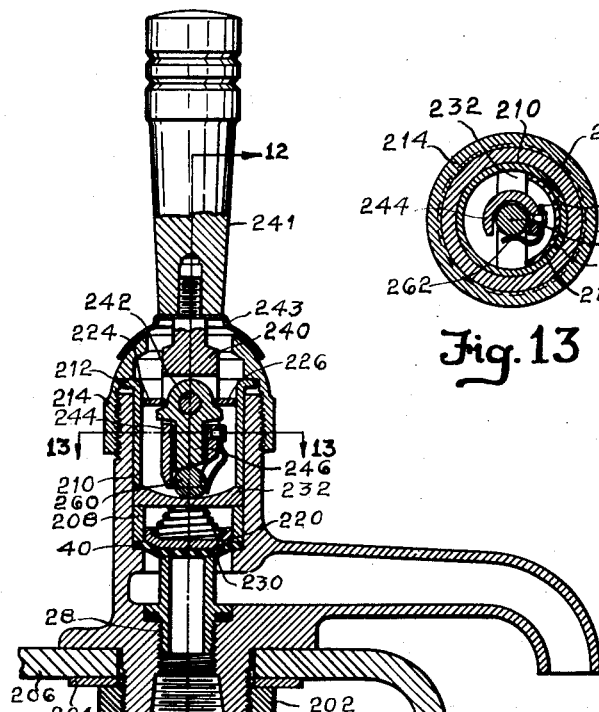
Figure 12:
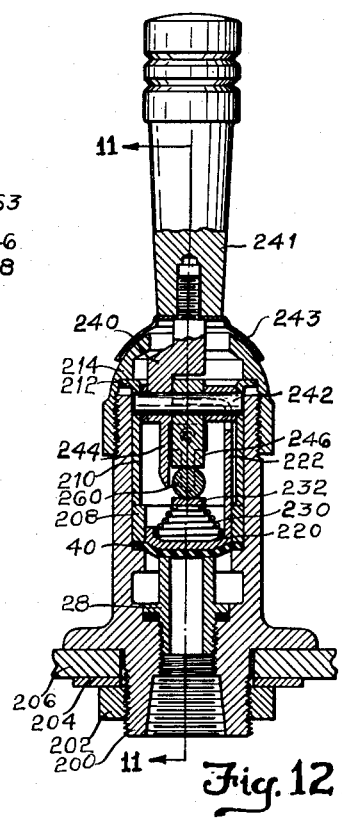

Figure 11 discloses a vertical cross sectional view of another modification, taken substantially on the line 11—11 of Figure 12.

Figure 12 is a vertical cross sectional view taken substantially on the line 12—12 of Figure 11.

Figure 13:
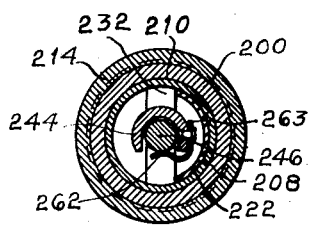

Figure 13 is a cross sectional view taken substantially on the line 13—13 of Figure 11.

Figure 14:
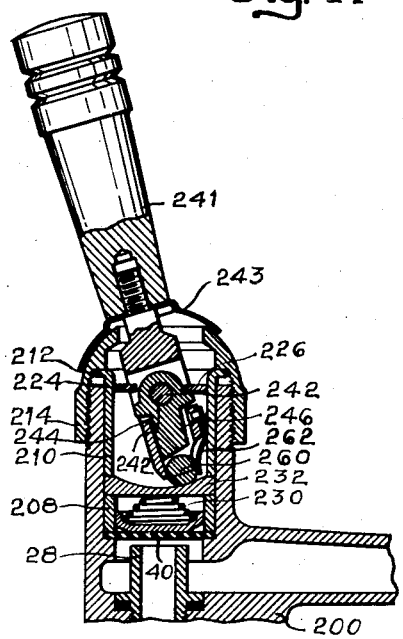
Figure 15:
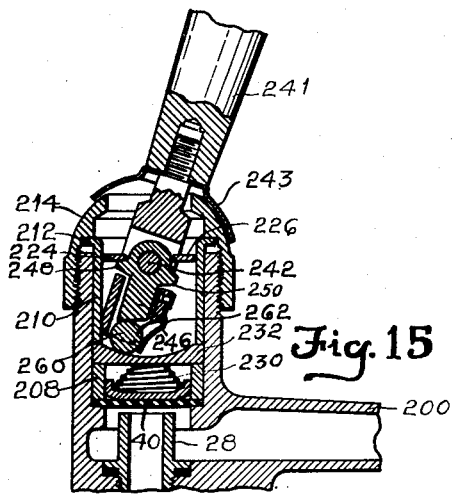

Figures 14 and 15 are fragmentary cross sectional views similar to Figure 11, showing the control mechanism moved into position to release the plunger to thereby open the valve, in Figure 14 moved into self closing position and in Figure 15 moved into locked position.

In the drawings, the reference character 20 designates a valve support, such as a lavatory, bath tub, sink or the like. This support 20 is provided with an aperture receiving the main body 22 of a valve assembly. The body 22 is held in position by a lock nut-like member 23 seated upon a gasket or washer 24. Member 23 is provided with both internal and external threads. The internal threads engage complementary threads on the upper portion of the main body 22, as is well known to those skilled in the art.

The body 22 is provided with an inlet or intake opening 25 and an outlet opening 26, or vice versa. A tubular valve member 28 is concentrically mounted in the main body 22 and is provided with a shoulder or flange 30 adapted to compress a gasket or sealing member 32. This gasket or sealing member is not essential if the threads form a tight union, in which event the flange 30 merely functions as a stop for the tubular valve member 28 when it is tightened into position. The top of the tubular valve member may be flat, as shown, or it may be provided with any other configuration that may be desirable in order to form a valve seat, as will appear more fully from the description that follows. If desired this tubular member can be made an integral part of body 22.

The conventional valves now generally used are provided with a rotatably mounted valve stem supporting a leather or washer at its base. Whenever the valve stem is rotated in one direction, the leather or washer is rotated into engagement with the valve seat, to thereby exert sufficient pressure to compress the leather or washer to seal or close the valve. This arrangement proves satisfactory when the contacting parts are in good condition; but the rotating of the valve stem causes the parts to have a rubbing action when sealing the valve, or closing the valve, which causes the contacting parts to wear rapidly, thereby necessitating replacement of the leathers or washers at frequent intervals. This construction also makes it impossible for the pliable washer or seal to conform itself to any irregularities in the seat. These leathers or washers are held in place by screws or nuts which can easily and do often come loose and get out of place, thereby preventing the proper functioning of the valve and often making it impossible to close the valve.

In the device disclosed herein, a yieldable diaphragm or partition 40 is positioned and sealed in position above the valve seat of the tubular valve member 28, so that the diaphragm is parallel to the valve seat. The margin of the yieldable diaphragm 40 is clamped in position by a tubular member 52 compressing the margin of the diaphragm into engagement with a shoulder 54 integral with the main body 22. The tubular member 52 is provided with a rabbet 56 receiving a lock nut 58 substantially L-shaped in cross sectional area, engaging the external threads of the upper portion of the main body member 22. This lock nut 58 is tightened sufficiently so as to completely seal the margin of the diaphragm 40 with respect to the shoulder 54. This diaphragm 40 may be made from any suitable yieldable or elastic material, such as rubber, neoprene or other synthetic rubbers. There are no screws or nuts in the construction of this valve to come loose or get out of place, thereby preventing proper action of the valve.

Figure 1:
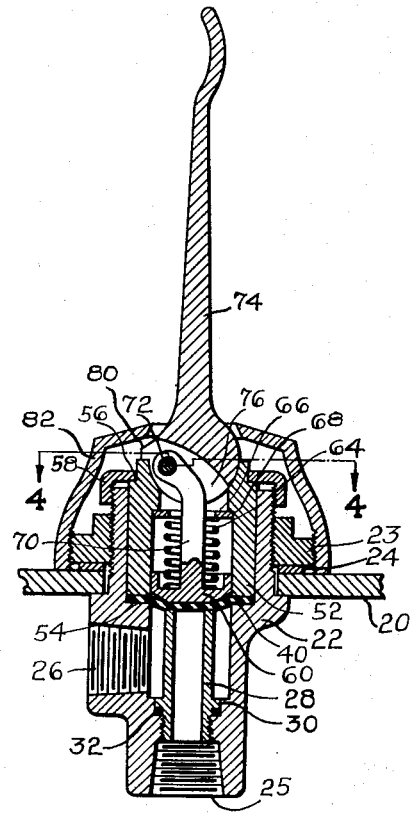
Figure 1 is a vertical cross sectional view of the preferred embodiment, showing the valve in closed position.

In order to close the valve, the center of the diaphragm 40 is pressed downwardly, as viewed in Figure 1, so as to cause the diaphragm 40 to engage the valve seat, to thereby seal the aperture or the end of the tubular valve member 28, to prevent the flow of fluid through the valve or faucet. The mechanism for actuating the diaphragm into and out of engagement with the end of the tubular valve member 28, so as to close and open the valve, will now be described.

A plunger-like piston 60 is mounted for reciprocatory movement in the tubular member 52 and is urged into the down position or valve closing position by a helical spring 64 having its lower end seated against the piston 60 and its upper end abutting a washer 66 seated against the shoulder 68 in tubular member 52. The central portion or area of the diaphragm 40 is spring urged through the piston 60 against the end of the tubular valve member 28. The pressure exerted by the spring 64 must be greater than the total upward force or pressure exerted by the fluid against the bottom of the diaphragm 40, in order that the valve be held in closed position. The piston 60 is provided with a piston rod or valve stem 70 pivotally attached at 72 to a handle or control stick 74. The lower end of the handle 74 is either cylindrical or spherical.

Figure 2:
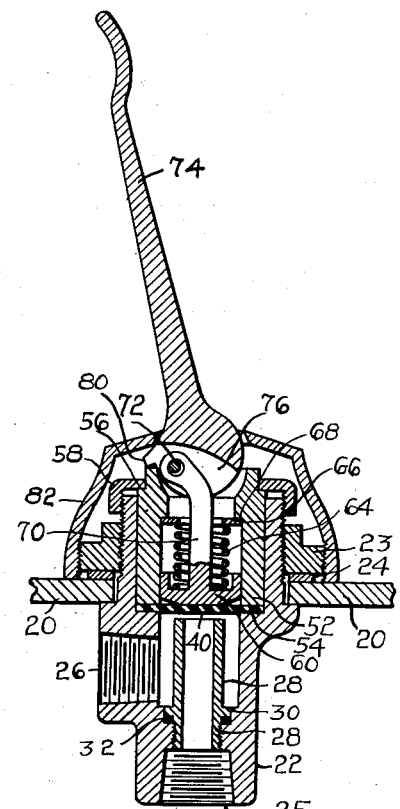
Figure 2 is a cross sectional view similar to the disclosure in Figure 1, showing the valve held in open position in readiness to reseat itself whenever the handle is released.

In the modification disclosed in the preferred embodiment, the lower end of member 74 is cylindrical and bifurcated, so as to have two lobes 76 between which the upper end of the piston rod or valve stem 70 is positioned. The upper end of tubular member 52 is provided with a cylindrical seat in which the lower end of the handle 74 is snugly seated. This forms a socket for the lower end of the handle. The pivot 72 is eccentrically disposed with respect to the center of the cylindrical surface of the lower end of the handle 74. In order to insure sufficient travel of piston 60 to fully close the valve, the pivot 72 may be smaller in diameter than the diameter of the hole through which it passes in the end of member 70 to provide a sloppy fit, as clearly shown in Figures 1, 2 and 3. The same result can be obtained by making the valve stem slightly longer than would be necessary in order to have the parts in the positions as shown in Figure 1.

Figures 3, 4:
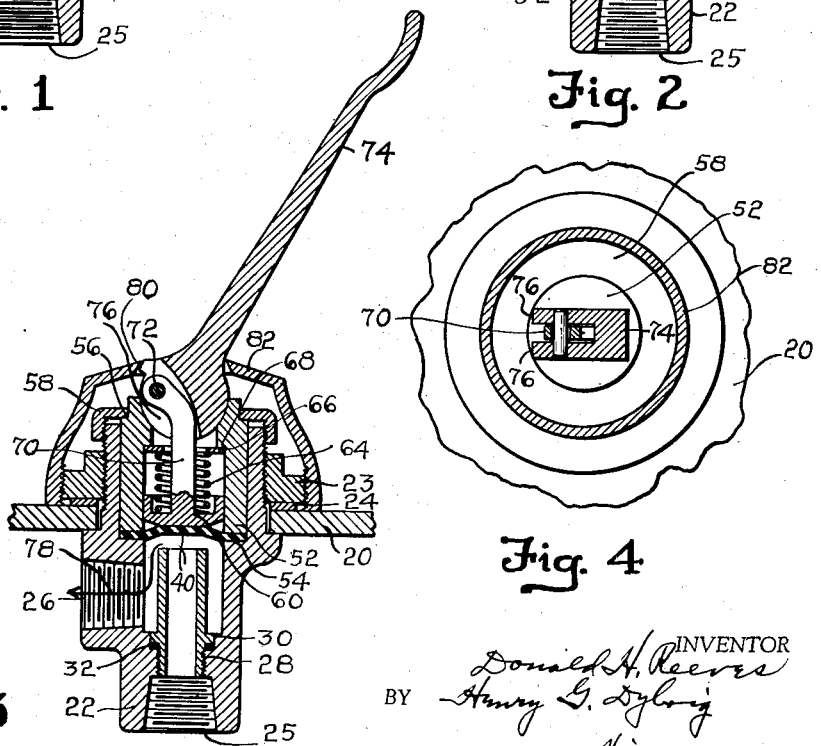
Figure 3 is a cross sectional view of the preferred embodiment, showing the valve in open position where the valve remains until the handle is actuated into home position to close the valve.
Figure 4 is a horizontal cross sectional view taken substantially on the line 4—4 of Figure 1.

Whenever the handle 74 is rotated in a clockwise direction, as viewed in Figure 1, the pivot 72 is raised, so as to raise the plunger-like piston 60 against the tension of the spring 64, to relieve the pressure exerted upon the diaphragm, so that the pressure of the fluid below the diaphragm will raise the diaphragm, thereby providing a clearance between the diaphragm and the valve seat formed at the end of the tubular member 28, as clearly viewed in Figure 3, to provide a passage for the flow of fluid in the direction of the arrow 78, shown in Figure 3. The friction between the arcuate surface of member 52 and the arcuate surface of the lower portion of the handle 74 depends upon the length of the arc of contact below the center of the arcs and is sufficient to frictionally hold the handle 74 in any adjusted position when actuated in a clockwise direction, as for example, into the position shown in Figure 3, to thereby cause the valve to remain open until the handle is manually reset to the position shown in Figure 1, at which time the spring 64 urges the plunger-like piston 60 to actuate the diaphragm into closed position, as viewed in Figure 1, to seal or close the valve.

Due to the fact that the force required to move the handle clockwise to open the valve, as viewed in Figure 1, comprises the force necessary to compress the spring plus the friction between the arcuate surfaces, whereas the force required to move the handle counterclockwise to close the valve comprises the friction less the spring pressure, the force required for closing is considerably less than the force required for opening, which is opposite of the action in valves now commonly used. This fact, combined with the fact that the handle can overtravel and still result in a closed valve, make it much more likely that the valve will be tightly closed, even when carelessly operated, than is true with valves now in common use.

A lug 80 interrupts the arcuate surface on the lower end of the handle 74. This lug 80 is positioned adjacent the pivot 72, so that the pivot 72 is located between the center of radius of curvature of the arcuate surface of the lower end of member 74 and the lug 80. In the event the handle 74 is actuated manually in a counterclockwise direction, as viewed in Figure 1, into the position shown in Figure 2, the lug 80 functions as a fulcrum for raising the plunger-like piston 60. When the handle 74 is in the position shown in Figure 2, and the actuating force is released from the handle 74, it automatically swings into home position, in that the spring 64, exerting a pressure against the piston 60, causes the handle 74 to move into upright position, or home position, as shown in Figure 1. Thus, it is seen, that by actuating the handle in one direction, it is frictionally held in this position, so that it will not return to home position without an external force being applied to the handle to actuate it into the home position. On the other hand, when the handle is actuated in another direction from the home position, it will automatically return to home position immediately upon the release of the actuating force.

By this arrangement, a valve mechanism is produced that remains open indefinitely when the handle is actuated into one position in the absence of an external force being applied to the handle and automatically closes when the handle is actuated into another position. Thereby, a valve mechanism is produced that may be used as a self-closing valve when actuated into one position and as a resettable valve when actuated into another position. Irrespective of which direction the handle 74 is actuated to open the valve, no fluid comes in contact with the movable parts. This prevents the fluid from causing corrosion or other deterioration to any of the movable parts and permits the use of a lubricant applied to the movable parts without there being any chance whatsoever of the lubricant entering the fluid stream, for the reason that the diaphragm 40 provides an absolutely fluid-tight seal between the fluid passage and the operating mechanism.

A suitable housing 82, provided with internal threads engaging the external threads of member 22, may be used to conceal the mechanism of the faucet, so as to present a neat appearance having the appearance of a finished commodity. The surface of the exposed parts may be chrome plated or finished in any other suitable manner to harmonize with the surroundings. In some installations it may be desirable to manufacture the handle 74 and the cover member 82 from a plastic molding material having the desirable shades or tints or the desirable finish to meet the exacting demands of the trade.

In the modification disclosed in Figures 5 to 10 inclusive, a main body portion 100 supports a tubular member 28 in a manner substantially identical to that described in connection with the preferred embodiment. An annular ring-like member 102, provided with internal and external threads, is used to clamp the main body member 100 in fixed relation with respect to the support 20. An inverted cup-shaped member 104 is used to clamp the diaphragm 40 in position. The inverted cup-shaped member 104 is held in position by an externally threaded bushing 106 engaging internal threads on member 100. A plunger-like piston 108 is mounted above the diaphragm 40 in the cylindrical cavity in the inverted cup-shaped member 104 and is held in the down position by a helical spring 110, having its lower end abutting a washer 112, resting in a cylindrical cavity in member 108 and the upper end of the spring 110 seated against the end wall of the cup-shaped member 104. A piston rod or plunger 114 has its head seated underneath the washer 112 and projects upwardly through a centrally disposed aperture in the top of the inverted cup-shaped member 104. The upper end of the piston rod or plunger 114 is provided with an annular channel having seated therein a bifurcated actuating member 120. This bifurcated member is provided with a pair of projections, ears or lobes 122, one for each furcation, that may be selectively engaged to open the valve against the force of the spring 110, as will appear more fully from the description of the actuating mechanism that follows.

The cup-shaped member 104 has fixedly attached thereto a guide shoe 130 provided with a pair of parallel side walls 132, having suitable apertures 134 and an arcuate guide surface 136. This guide shoe 130 supports a handle 140, having a pair of downwardly projecting centrally disposed lobes 142 provided with apertures receiving a pin 144 that passes through the apertures 134 and apertures in the downwardly projecting lobes 142. This provides a pivotal support for the handle 140. The lower end of the handle 140, as is best seen by referring to Figures 5, 7, 8, 9 and 10, is provided with a pair of lateral extensions 150 and 152. The lateral extension 150 is provided with a channel 154, adapted to receive a roller 156 or a ball engaging the arcuate surface 136 of the shoe 130. The pin 144, in addition to providing a pivotal support for the handle, also supports a floating actuating member 160. Friction washers 161 are positioned on the pin 144 and located between the side surfaces of member 160 and lobes 142 of handle 140. Member 160 is provided with a bevelled toe 162 projecting into the channel-shaped recess 154 in the extension 150. A leaf spring 170 is fixedly attached to the extension 152 by a suitable rivet 172. This leaf spring 170 has its free end arranged in short spaced relation from the arcuate surface 136 and is adapted to support the roller 156 normally in engagement with the arcuate surface 136.

Figure 5:
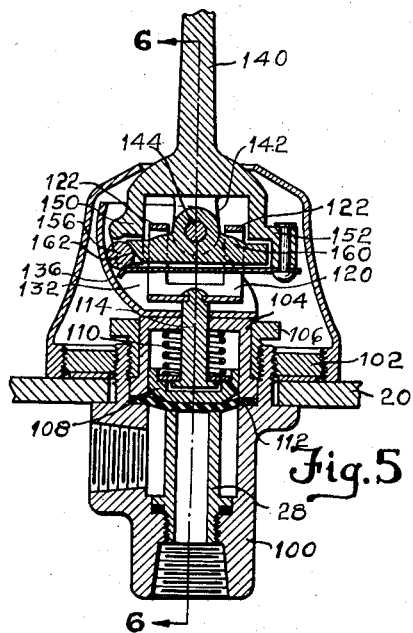
Figure 5 is a vertical cross sectional view of a modification, taken substantially on the line 5—5 of Figure 6.
Figure 6:
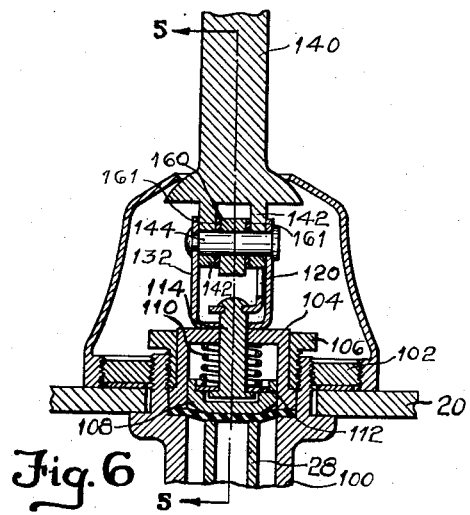
Figure 6 is a fragmentary cross sectional view of the modification, taken substantially on the line 6—6 of Figure 5.
Figure 7:
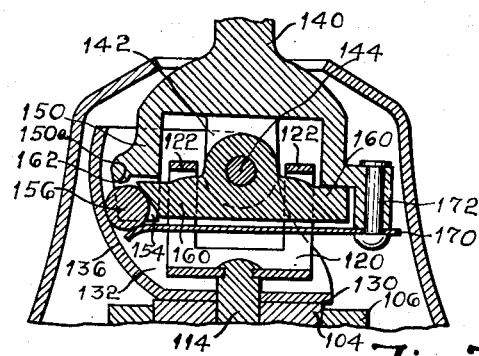
Figure 7 is a fragmentary cross sectional view of a portion of the cross sectional view shown in Figure 5, but on a much larger scale.

When the handle 140 is rotated in a counterclockwise direction, as viewed in Figure 5, projections 155 on handle 140 contact the end of spring 170, forcing it out of engagement with roller 156, after which the arcuate rib 150a, of the extension 150, engages the roller 156, so as to cause this roller to move downwardly in a counterclockwise direction along the guide surface 136 and out of engagement with the bevelled toe 162. However, as soon as the handle 140 is rotated in a counterclockwise direction, the toe 162 is engaged by the extension 150, so as to rotate member 160 in a counterclockwise direction, to cause one of the ears 122 to be engaged by member 160, thereby raising member 120 and with it the piston rod 114 and the piston 108 against the tension of the spring 110, so as to release the diaphragm 40 from engagement with the tubular valve member 28 to open the valve. As soon as the force exerted against the handle 140 is released, the tension of the spring 110 exerts a downward force upon the ear 122 in engagement with member 160, to rotate it in a clockwise direction, thereby permitting the handle 140 to move into the home position. The spring 170 causes the roller 156 to be moved into home position.

Figure 8:
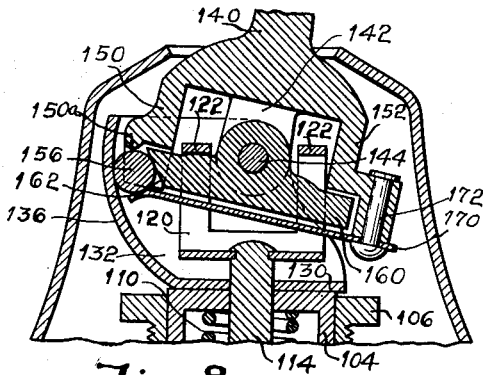
Figure 8 is another fragmentary cross sectional view similar to Figure 7, showing the valve actuating mechanism in open position.
Figure 10:
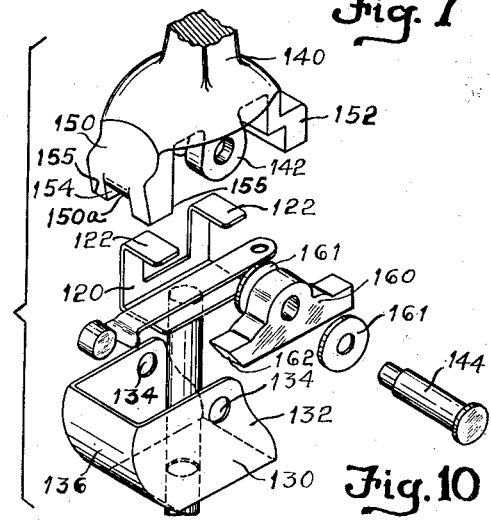
Figure 10 is an exploded view of the actuating mechanism of the modification disclosed in Figures 5 to 9 inclusive.
Figure 9:
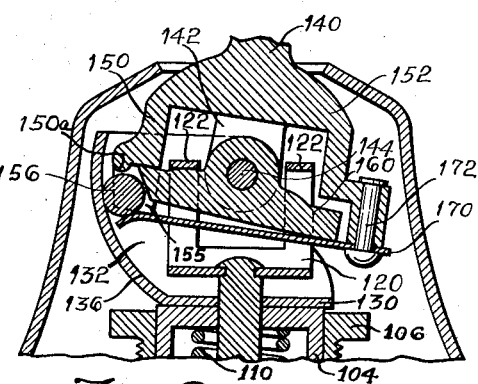
Figure 9 is another fragmentary cross sectional view disclosing the release of the locking roller to cause the valve to be closed.

When the handle 140 is rotated in a clockwise direction, as viewed in Figure 5, member 160 will be tilted in the opposite direction, so as to cause one of the extensions of 160 to engage the other ear 122 to release the diaphragm. In so doing, the spring 170 will cause the roller 156 to rotate upwardly on the guide surface 136, so as to be positioned in engagement with the bevelled surface of the toe 162; but when in this position, the roller 156 is wedged between the guide surface 136 and the bevelled toe 162 of member 160, so as to lock the parts in position, thereby preventing the return of the valve to the closed position and thereby, preventing the handle 140 from being actuated into home position when the actuating force is released from the handle 140. Whenever the handle 140, when in the position shown in Figure 8, is actuated in a counterclockwise direction a short distance by a force on the right side of the handle, projections 155 force spring 170 out of engagement with roller 156, after which the rib portion 150a engages the roller 156 to remove it from its wedging position as shown in Figure 9, thereby permitting member 160 to be oscillated in a counterclockwise direction, while friction washers 161 maintain the relative positions of handle 140 and member 160, so as to keep roller 156 out of its wedging position and permit the spring 110 to actuate the diaphragm in the valve into closed position shown in Figure 5, thereby insuring complete closure of the valve.

If it is desired to partially close the valve, this can be done by moving handle 140 counterclockwise until the desired opening is obtained and then stopping the handle in this position. Spring 110 will further rotate member 160 counterclockwise until this member, the handle and roller 156 are again in the relative positions shown in Figure 8, with member 160 locked against further counterclockwise rotation. Instead of using a ball or a roller as a wedge, any other suitably shaped wedging member may be used.

In the modification disclosed in Figures 11 to 15 inclusive, another type of faucet structure has been shown. In this type the main body portion 200 simulates a conventional faucet and is held in position by a nut 202, which preferably engages a gasket member 204, clamping the main body portion to the support 206. A tubular valve member 28 is concentrically mounted in a manner similar to member 28 shown in the preferred embodiment and in the first modification. The diaphragm 40 is held in position by an annular ring 208 clamped in position by a sleeve member 210 provided with an outwardly extending flange 212 held in position by a nut or threaded capping member 214, threadedly engaging the main body portion 200. A piston-like plunger member 220 is used for actuating the diaphragm 40 into open and closed position. This piston-like member 220 is provided with an upwardly extending standard 222, terminating in a pair of arms 224 and 226. The piston-like plunger member 220 is urged into closed position by a helical or conical spring 230, positioned underneath an arcuate guide member and spanning member 232.

The mechanism for raising the plunger 220, so as to open the faucet or valve, includes a handle support 240 pivotally mounted on a pin 242, having its ends mounted in member 210. Handle 241 is fastened to handle support 240 with the inverted cup-shaped hole cover 243 between them. The lower end of the handle support 240 includes a U-shaped portion 244 that partially surrounds a freely rotatable pawl 246 pivotally mounted upon the pin 242. The diameter of the pawl extending into the tubular portion 244 is somewhat smaller than the internal diameter of the U-shaped portion. The pawl 246 is provided with a pair of ears 248 and 250, so that as the handle 241 is rotated about the pivot 242 in a counterclockwise direction, the ear 248 engages the arm 224 to raise the piston. If the handle 241 is actuated in a clockwise direction, the ear 250 engages the arm 226 to raise the plunger. The lower end of the pawl 246 is bevelled and is positioned in contact with a ball 260 or a roller, rotating upon the spanning member 232, having an arcuate guide surface for supporting the roller. A spring 262, attached to the U-shaped portion 244, actuates the roller into engagement with the bevelled surface of the pawl 246. The spring 262 has a portion 263 which contacts the side of pawl 246. If the handle 241 is rotated in a counterclockwise direction, the lower lip of the U-shaped member 244, shown to the left of the ball 260, actuates the ball before the pawl 246 moves. This permits the ball to rotate towards the right, as viewed in Figure 11, to permit the opening of the valve. When the valve has been opened and the external force that has been applied to the handle 241 is released, the spring 230 will exert a pressure that closes the valve and rotates the handle 241 to home position. The ball 260 will trail the bevelled surface upon the lower end of the pawl 246. If the handle 241 is rotated in a clockwise direction, as viewed in Figure 11, the ball 260 will lock the handle into adjusted position, in that the spring 262 will actuate the ball into contact with the bevelled surface on the lower end of 246, so as to form a wedge, preventing the pawl 246 and thereby the handle 241 from returning to home position. By supplying an external force to the right hand side of handle 241, rotating it counterclockwise a small distance, the lower lip of the tubular portion 244 will engage the ball 260 to force it out of wedging position, while section 263 of spring 262, rubbing on pawl 246, tends to keep this pawl and the handle in this relative position and keep ball 260 out of wedging position, thereby permitting the parts to return to home position and thereby insuring complete closing of the valve at the will of the user.

If desired, the valve can be partially closed by moving the handle counterclockwise until the desired flow is obtained and stopping the movement of the handle at this point. Spring 230 will force pawl 246 to rotate further in a counterclockwise direction until ball 260 is wedged between its bevelled end and arcuate member 232, preventing further movement of the pawl or valve.

In some installations it may be desirable to utilize a valve or faucet that always closes whenever the external force applied on the handle is released. This is especially the case where faucets are used in public places and it is necessary to close the valve in order to eliminate waste. For such installations, in the preferred embodiment it is merely necessary to place two lugs 80, shown in the preferred embodiment, one on either side, with pivot 72 midway between these two lugs, so that irrespective of the direction of movement of the handle, it will automatically move into closed position when the external force is released.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a valve assembly of the diaphragm type wherein the diaphragm is movable into contact with the valve seat to close the valve and away from the valve seat to open the valve, the combination including a plunger for actuating the diaphragm into closed position, and control means for actuating the plunger away from and towards the diaphragm, said control means including a guide surface, a wedging member normally in contact with the guide surface, and oscillatory means engaging the wedging member to lock the control means in an adjusted position.

2. In a valve assembly of the diaphragm type wherein the diaphragm is movable into contact with the valve seat to close the valve and away from the valve seat to open the valve, the combination including a plunger for actuating the diaphragm into closed position, and control means for actuating the plunger away from and towards the diaphragm, said control means including a guide surface, a wedging member normally in contact with the guide surface, oscillatory means engaging the wedging member to lock the control means in an adjusted position, and means for releasing the wedging means to permit the diaphragm to be actuated into closed position.

3. In a valve assembly wherein a valve member is movable into contact with a valve seat to close the valve and away from the valve seat to open the valve, the combination including a pivotally mounted handle mounted for oscillatory movement, an oscillatory actuating member mounted for pivotal movement upon a pivot concentric with the pivot of the handle and oscillated thereby, and means for actuating the valve, said means including a member having a pair of extensions straddling the pivot and the oscillatory member so that as the oscillatory member is oscillated in one direction it engages one of the extensions and when oscillated in the opposite direction it engages the other extension.

4. In a valve assembly wherein a valve member is movable into contact with a valve seat to close the valve and away from the valve seat to open the valve, the combination including a pivotally mounted handle mounted for oscillatory movement, an oscillatory member pivotally mounted upon the same pivot as the handle, said handle actuating the oscillatory member, means for interconnecting the valve to said oscillatory member, said means including a valve stem, a member attached to the valve stem, said last mentioned member having a pair of extensions overlying the oscillatory member so that one extension is located on one side of the pivot and the other extension is located on the opposite side of the pivot so that as the handle is oscillated the oscillatory member engages one of the extensions to actuate the valve, and resilient means for closing the valve.

5. An actuating mechanism for actuating a reciprocatory load, said actuating mechanism including a pivotally mounted handle having a pair of extensions, an oscillatory member pivotally mounted on the pivot concentrically located with respect to the pivot of the handle, said oscillatory member being arranged to engage the extensions of the handle, means for interconnecting the load to the oscillatory member, said means including a spring for urging the load away from the oscillatory member and a member including a pair of projections extending over the oscillatory member, one of said projections being located on one side of the pivot and the other projection on the other side of the pivot so that when the handle is oscillated in one direction the oscillatory member engages a projection located to one side of the pivot to actuate the load against the force of the spring and when the handle is oscillated in the opposite direction the oscillatory member engages the other projection so as to actuate the load against the force of the spring.

6. An actuating mechanism for actuating a load including a pivotally mounted handle having a pair of oppositely disposed extensions, an oscillatory member pivotally mounted on a pivot concentrically located with respect to the pivot of the handle said oscillatory member being oscillated in one direction by one of the extensions and in the opposite direction by the other extension, connecting means for interconnecting the oscillatory member to the load, said connecting means including a member having a pair of projections overlying the oscillatory member, so that one projection is located on one side of the pivot and the other projection is located on the other side of the pivot whereby oscillatory movements of the oscillatory member causes the oscillatory member to contact one of the projections to pull the load.

7. An actuating mechanism for actuating a valve from closed position to open position and vice versa, said actuating mechanism including a pivotally mounted handle having a pair of extensions located in opposite directions from the pivot, an oscillatory member mounted upon the pivot and extending in opposite directions from the pivot so as to be engaged by the extensions of the handle, said oscillatory member having one end bevelled, means for interconnecting the oscillatory member to the valve, said means including a spring for resiliently urging the valve in one direction, and a connecting member attached to the valve, said connecting member having a pair of projections extending over the oscillatory member so that one of said projections is located on one side of the pivot and the other projection is located on the other side of the pivot whereby as the handle is oscillated one of the projections is engaged by the oscillatory member to actuate the valve against the force of the spring, and means cooperating with the bevelled surface of the oscillatory member for holding the valve in adjusted position.

8. An actuating mechanism for actuating a valve from closed position to open position and vice versa, said actuating mechanism including a pivotally mounted handle having a pair of extensions located in opposite directions from the pivot, an oscillatory member mounted upon the pivot and extending in opposite directions from the pivot so as to be engaged by the extensions of the handle, said oscillatory member having one end bevelled, means for interconnecting the oscillatory member to the valve, said means including a spring for resiliently urging the valve in one direction, and a connecting member attached to the valve, said connecting member having a pair of projections extending over the oscillatory member so that one of said projections is located on one side of the pivot and the other projection is located on the other side of the pivot whereby as the handle is oscillated one of the projections is engaged by the oscillatory member to actuate the valve against the force of the spring, and means cooperating with the bevelled surface of the oscillatory member for holding the valve in adjusted position, said last mentioned means including an arcuate guide and a rotary member positioned between the arcuate guide and the bevelled end of the oscillatory member functioning as a wedge to hold the oscillatory member in adjusted position.

9. In a valve assembly wherein a valve member is movable into contact with a valve seat to close the valve and away from the valve seat to open the valve, the combination including a handle, an oscillatory member having one end bevelled, said oscillatory member being actuated by the handle, means for interconnecting the oscillatory member to the valve so as to actuate the valve in response to oscillatory movements of said member, and means cooperating with the bevelled surface of the oscillatory member for holding the valve in adjusted position.

10. In a valve assembly wherein a valve member is movable into contact with a valve seat to close the valve and away from the valve seat to open the valve, the combination including a handle, an oscillatory member being actuated by the handle, means for interconnecting the oscillatory member to the valve so as to actuate the valve in response to oscillatory movements of said member, and means engaging the oscillatory member for holding the valve in any adjusted position.

11. In valve assembly of the diaphragm type wherein a diaphragm is movable into contact with the valve seat to close the valve and away from the valve seat to open the valve, the combination including a plunger having a stem, said plunger actuating the diaphragm into closed position, resilient means for holding the plunger against the diaphragm in closed position, and actuating means including a lever pivotally attached to the stem of the plunger and oscillating in a direction normal to the axis of the plunger, said actuating means actuating the plunger against the resilient means away from the diaphragm to permit the valve to open into a position selected from an infinite number of positions, said actuating means including a locking member for locking the valve in any selected open position only when said actuating means is actuated in one direction, said actuating means including a resettable mechanism for releasing the locking member to permit the resilient means to actuate the plunger into closed position when the actuating means is actuated in another direction.

DONALD H. REEVES.

REFERENCES CITED

The following references are of record in the file of this patent:

UNITED STATES PATENTS

| Number | Name | Date |
|---|---|---|
| 619,216 | Phillips | Feb. 7, 1899 |
| 941,703 | Fitts | Nov. 30, 1909 |
| 995,016 | Julius | June 13, 1911 |
| 1,078,875 | Pyle | Nov. 18, 1913 |
| 1,315,828 | Gillette | Sept. 9, 1919 |
| 1,605,765 | Papirt | Nov. 2, 1926 |
| 2,089,977 | Marchant | Aug. 17, 1937 |

FOREIGN PATENTS

| Number | Country | Date |
|---|---|---|
| 414,091 | France | 1910 |
| 731,300 | France | 1932 |